United States Patent
Gundy et al.

(10) Patent No.: US 10,782,893 B2
(45) Date of Patent: Sep. 22, 2020

(54) INHIBITING TRACKS WITHIN A VOLUME OF A STORAGE SYSTEM

(71) Applicant: International Business Machines Corporation, Armonk, NY (US)

(72) Inventors: Lisa J. Gundy, Tucson, AZ (US); Michael J. Koester, Hollister, CA (US); Kevin L. Miner, Apopka, FL (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 15/439,805

(22) Filed: Feb. 22, 2017

(65) Prior Publication Data

US 2018/0239544 A1 Aug. 23, 2018

(51) Int. Cl.
*G06F 12/00* (2006.01)
*G06F 13/00* (2006.01)
*G06F 3/06* (2006.01)

(52) U.S. Cl.
CPC ............ *G06F 3/0619* (2013.01); *G06F 3/065* (2013.01); *G06F 3/0647* (2013.01); *G06F 3/0685* (2013.01)

(58) Field of Classification Search
CPC .... G06F 3/0619; G06F 3/0637; G06F 3/0647; G06F 3/065; G06F 3/0659; G06F 3/0673
USPC ........................................................ 711/112
See application file for complete search history.

(56) References Cited

U.S. PATENT DOCUMENTS

| | | | | |
|---|---|---|---|---|
| 4,580,211 A | * | 4/1986 | Doki | G06F 3/0601 711/171 |
| 4,916,605 A | * | 4/1990 | Beardsley | G06F 11/1666 701/18 |
| 4,939,598 A | * | 7/1990 | Kulakowski | G06F 3/0601 360/48 |
| 5,072,378 A | * | 12/1991 | Manka | G06F 3/0601 714/6.12 |
| 5,132,853 A | * | 7/1992 | Kulakowski | G06F 3/0601 360/48 |
| 5,140,683 A | * | 8/1992 | Gallo | G06F 12/08 711/114 |
| 5,157,770 A | * | 10/1992 | Beardsley | G06F 3/0601 711/112 |
| 5,293,608 A | * | 3/1994 | Johnson | G06F 12/0866 711/113 |

(Continued)

OTHER PUBLICATIONS

Quinn, "Symmetrix SW Update for IBM Mainframe," EMC Forum, Oct. 6, 2011, pp. 1-53.

(Continued)

*Primary Examiner* — Sheng Jen Tsai
(74) *Attorney, Agent, or Firm* — Zilka-Kotab, P.C.

(57) ABSTRACT

A computer-implemented method according to one embodiment includes receiving a first command to inhibit one or more tracks within a volume of a storage system, in response to the first command, identifying the one or more tracks within the volume of the storage system, utilizing the first command or a previous command, and inhibiting the one or more tracks within the volume of the storage system, receiving a second command to copy data to the one or more tracks within the volume of the storage system, identifying the one or more tracks within the volume of the storage system as inhibited, and rejecting the second command, in response to the identifying.

13 Claims, 8 Drawing Sheets

(56) References Cited

U.S. PATENT DOCUMENTS

| | | | | |
|---|---|---|---|---|
| 5,379,385 | A * | 1/1995 | Shomler | G06F 3/0601 710/38 |
| 5,521,772 | A * | 5/1996 | Lee | G11B 5/5582 360/69 |
| 5,528,755 | A * | 6/1996 | Beardsley | G06F 11/004 714/47.1 |
| 5,535,372 | A * | 7/1996 | Benhase | G06F 3/0613 360/48 |
| 5,644,444 | A * | 7/1997 | Braithwaite | G11B 19/04 360/60 |
| 6,081,897 | A * | 6/2000 | Bersson | G11B 19/12 705/57 |
| 6,108,749 | A | 8/2000 | White et al. | |
| 6,145,066 | A * | 11/2000 | Atkin | G06F 3/0605 709/208 |
| 6,188,535 | B1 * | 2/2001 | Lemke | G11B 5/0086 360/70 |
| 6,192,444 | B1 * | 2/2001 | White | G06F 3/0608 711/2 |
| 6,209,070 | B1 * | 3/2001 | Reed | G06F 3/0619 710/33 |
| 6,412,030 | B1 * | 6/2002 | Adusumilli | G06F 13/1621 710/2 |
| 6,425,050 | B1 * | 7/2002 | Beardsley | G06F 12/0804 711/113 |
| 6,453,397 | B1 * | 9/2002 | Okuda | G06F 12/1433 711/103 |
| 6,502,174 | B1 * | 12/2002 | Beardsley | G06F 12/0866 707/999.202 |
| 6,513,097 | B1 * | 1/2003 | Beardsley | G06F 11/0724 711/113 |
| 6,724,554 | B1 * | 4/2004 | Braithwaite | G11B 19/04 360/60 |
| 6,738,877 | B1 * | 5/2004 | Yamakawa | G06F 21/31 711/163 |
| 6,795,890 | B1 * | 9/2004 | Sugai | G11C 16/102 365/185.29 |
| 6,910,214 | B1 * | 6/2005 | Reed | G06F 3/0605 711/114 |
| 7,080,051 | B1 * | 7/2006 | Crawford | G06F 8/61 379/111 |
| 7,149,046 | B1 * | 12/2006 | Coker | G11B 5/255 360/75 |
| 7,831,788 | B1 | 11/2010 | Ohr et al. | |
| 8,527,732 | B2 | 9/2013 | Tatara | |
| 9,430,162 | B1 | 8/2016 | McBride et al. | |
| 9,471,235 | B1 * | 10/2016 | Gair, Jr. | G06F 3/0604 |
| 9,921,973 | B2 * | 3/2018 | Benhase | G06F 12/123 |
| 10,216,439 | B2 * | 2/2019 | Branch | G06F 3/0623 |
| 2001/0003449 | A1 * | 6/2001 | Kimura | G06F 3/014 345/157 |
| 2002/0176341 | A1 * | 11/2002 | Ko | G11B 7/00736 369/53.21 |
| 2004/0186858 | A1 * | 9/2004 | McGovern | G06F 16/181 |
| 2005/0144408 | A1 * | 6/2005 | Ejima | G06F 21/52 711/163 |
| 2005/0262300 | A1 * | 11/2005 | Mannen | G06F 3/0623 711/114 |
| 2006/0095688 | A1 * | 5/2006 | Kawamura | G06F 3/0622 711/152 |
| 2006/0106971 | A1 * | 5/2006 | Mahar | G06F 3/0605 711/100 |
| 2006/0132954 | A1 * | 6/2006 | Wada | G11B 5/02 360/48 |
| 2008/0183960 | A1 * | 7/2008 | Suarez | G06F 3/0619 711/112 |
| 2008/0239554 | A1 * | 10/2008 | Takeda | G11B 5/59633 360/77.02 |
| 2009/0210617 | A1 * | 8/2009 | Lehr | G06F 3/0617 711/112 |
| 2009/0210769 | A1 * | 8/2009 | Casper | H03M 13/09 714/758 |
| 2011/0282846 | A1 * | 11/2011 | Shepard | G06F 11/0727 707/687 |
| 2013/0024628 | A1 * | 1/2013 | Benhase | G06F 12/0891 711/144 |
| 2013/0073826 | A1 | 3/2013 | Tatara | |
| 2013/0185514 | A1 * | 7/2013 | Benhase | G06F 12/123 711/136 |
| 2014/0359168 | A1 * | 12/2014 | Carlson | G06F 3/002 710/5 |
| 2015/0089509 | A1 * | 3/2015 | Brown | G06F 9/5016 718/103 |
| 2016/0048522 | A1 | 2/2016 | Wilcock | |
| 2017/0220272 | A1 * | 8/2017 | Branch | G06F 3/0623 |
| 2017/0344493 | A1 * | 11/2017 | Ash | G06F 12/0811 |

OTHER PUBLICATIONS

Wikipedia, "Data set (IBM Mainframe)," Feb. 4, 2016, pp. 1-3, Retrieved From https://en.wikipedia.org/wiki/Data_set_(IBM_mainframe).

Wikipedia, "Volume (Computing)," Dec. 6, 2016, pp. 1-4, Retrieved From https://en.wikipedia.org/wiki/volume_(computing).

* cited by examiner

INHIBITING TRACKS WITHIN A VOLUME OF A STORAGE SYSTEM

BACKGROUND

The present invention relates to data integrity, and more specifically, this invention relates to preventing overwriting of specific tracks within a volume of a storage system.

Storage systems are commonly used to store data in computing environments. For example, data may reside on tracks of volumes within storage systems of a system. However, certain actions that are performed utilizing storage systems may result in data loss. For example, copy service operations that copy data from tracks of a source volume to tracks of a (or one or more) target volume(s) may result in the data being copied overlaying onto important data within tracks of one or more target volumes. This may result in lost access to data within one or more of the target storage systems.

SUMMARY

A computer-implemented method according to one embodiment includes receiving a first command to inhibit one or more tracks within a volume of a storage system, in response to the first command, identifying the one or more tracks within the volume of the storage system, utilizing the first command or a previous command, and inhibiting the one or more tracks within the volume of the storage system, receiving a second command to copy data to the one or more tracks within the volume of the storage system, identifying the one or more tracks within the volume of the storage system as inhibited, and rejecting the second command, in response to the identifying.

According to another embodiment, a computer program product for inhibiting one or more tracks within a volume of a storage system comprises a computer readable storage medium having program instructions embodied therewith, wherein the computer readable storage medium is not a transitory signal per se, and where the program instructions are executable by a processor to cause the processor to perform a method comprising receiving a first command to inhibit one or more tracks within a volume of a storage system, utilizing the processor, in response to the first command, identifying, utilizing the processor, the one or more tracks within the volume of the storage system, utilizing the first command or a previous command, and inhibiting the one or more tracks within the volume of the storage system, utilizing the processor, receiving a second command to copy data to the one or more tracks within the volume of the storage system, utilizing the processor, identifying the one or more tracks within the volume of the storage system as inhibited, utilizing the processor, and rejecting the second command, in response to the identifying, utilizing the processor.

A system according to another embodiment includes a processor, and logic integrated with the processor, executable by the processor, or integrated with and executable by the processor, the logic being configured to receive a first command to inhibit one or more tracks within a volume of a storage system, in response to the first command, identify the one or more tracks within the volume of the storage system, utilizing the first command or a previous command, and inhibit the one or more tracks within the volume of the storage system, receive a second command to copy data to the one or more tracks within the volume of the storage system, identify the one or more tracks within the volume of the storage system as inhibited, and reject the second command, in response to the identification.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for inhibiting tracks within a volume of a storage system. Various embodiments provide a method to inhibit tracks within a storage system in response to a first command, and subsequently rejecting later commands to copy data to the inhibited tracks.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for inhibiting tracks within a volume of a storage system.

In one general embodiment, a computer-implemented method includes receiving a first command to inhibit one or more tracks within a volume of a storage system, in response to the first command, identifying the one or more tracks within the volume of the storage system, utilizing the first command or a previous command, and inhibiting the one or more tracks within the volume of the storage system, receiving a second command to copy data to the one or more tracks within the volume of the storage system, identifying the one or more tracks within the volume of the storage system as inhibited, and rejecting the second command, in response to the identifying.

In another general embodiment, a computer program product for inhibiting one or more tracks within a volume of a storage system comprises a computer readable storage medium having program instructions embodied therewith, wherein the computer readable storage medium is not a transitory signal per se, and where the program instructions are executable by a processor to cause the processor to perform a method comprising receiving a first command to inhibit one or more tracks within a volume of a storage system, utilizing the processor, in response to the first command, identifying, utilizing the processor, the one or more tracks within the volume of the storage system, utilizing the first command or a previous command, and inhibiting the one or more tracks within the volume of the storage system, utilizing the processor, receiving a second command to copy data to the one or more tracks within the volume of the storage system, utilizing the processor, identifying the one or more tracks within the volume of the storage system as inhibited, utilizing the processor, and rejecting the second command, in response to the identifying, utilizing the processor.

In another general embodiment, a system includes a processor, and logic integrated with the processor, executable by the processor, or integrated with and executable by the processor, the logic being configured to receive a first command to inhibit one or more tracks within a volume of a storage system, in response to the first command, identify the one or more tracks within the volume of the storage system, utilizing the first command or a previous command, and inhibit the one or more tracks within the volume of the storage system, receive a second command to copy data to the one or more tracks within the volume of the storage system, identify the one or more tracks within the volume of the storage system as inhibited, and reject the second command, in response to the identification.

Figure 1:
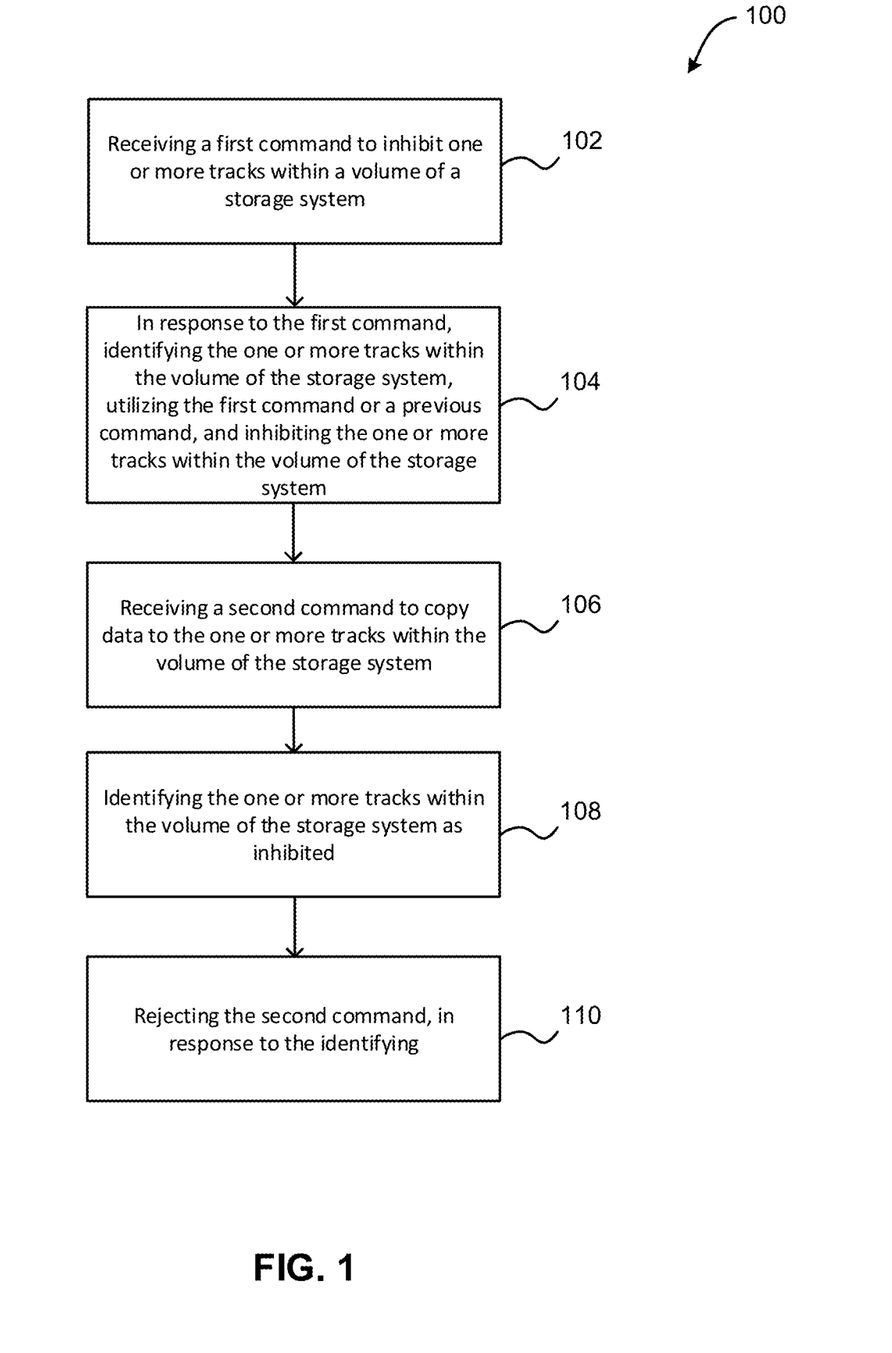
FIG. 1 illustrates a method for inhibiting tracks within a volume of a storage system, in accordance with one embodiment.

Referring to FIG. 1, a flowchart of a method 100 is shown according to one embodiment. The method 100 may be performed in accordance with the present invention in any of the environments depicted in FIGS. 6-8, among others, in various embodiments. Of course, more or less operations than those specifically described in FIG. 1 may be included in method 100, as would be understood by one of skill in the art upon reading the present descriptions.

Each of the steps of the method 100 may be performed by any suitable component of the operating environment. For example, in various embodiments, the method 100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 1, method 100 may initiate with operation 102, where a first command to inhibit one or more tracks within a volume of a storage system is received. In one embodiment, the storage system may include a direct access storage device (DASD). In another embodiment, the storage system may include one or more volumes. For example, the storage system may include a plurality of volumes, where each volume may be used for storing data, executable programs, working storage, etc. In another embodiment, each volume may include one or more tracks. For example, the recording surface of each volume may be divided into a plurality of concentric tracks (e.g., extents, etc.). In yet another embodiment, the storage system may include one or more disk drives, one or more magnetic drums, one or more data cells, optical media, a tiered data storage system such as that shown in FIG. 8, etc.

Additionally, in one embodiment, the storage system may include an access mechanism including one or more read/write heads used to transfer data as the recording surface rotates past the heads. In another embodiment, the first command may include a command to prevent an inboard copying of data to the one or more tracks. For example, the first command may include a command to prevent data from another track of another volume to be written onto the track.

Further, in one embodiment, the first command may include a channel program (CCW) that specifies the one or more tracks to be inhibited. For example, the CCW may indicate a plurality of specific tracks within a volume to be inhibited. In another example, the first command may include a track-level inhibit outboard copy CCW. In another embodiment, the first command may include a volume-level inhibit outboard copy CCW that has been modified to operate at the track level as well as the volume level. In yet another embodiment, the CCW may last across an IML.

Further still, in one embodiment, the one or more tracks may be included within a predetermined data structure stored within the volume. In another embodiment, the predetermined data structure may include a table of contents (e.g., a volume table of contents (VTOC)., etc.). For example, the VTOC may provide a location of all data sets in the volume. In another example, the VTOC may indicate what tracks are allocated (e.g., used, etc.) and which tracks are free. In yet another example, VTOC information may be stored as data set control block records within the VTOC tracks of the volume.

Also, in one embodiment, the one or more tracks may be specified by a user. In another embodiment, the one or more tracks may be identified dynamically in response to a user request to inhibit a data set within the volume. For example, a request may be received to inhibit tracks associated with all data sets in the volume's table of contents. In response to the request, the data set tracks may be identified. Once the data set tracks are obtained, a command to inhibit the tracks may be initiated.

Additionally, as shown in FIG. 1, method 100 may proceed with operation 104, where in response to the first command, the one or more tracks within the volume of the storage system are identified, utilizing the first command or a previous command, and the one or more tracks are inhibited within the volume of the storage system. In one embodiment, inhibiting the one or more tracks may include preventing outboard copying to the track. For example, the one or more tracks may be disabled from being copied to. In another embodiment, inhibiting the one or more tracks may include marking the one or more tracks as inhibited (e.g., using one or more of a label, a flag, an index, etc.). In yet another embodiment, inhibiting the one or more tracks may include disabling the one or more tracks from being copied to via a copy service. For example, the one or more tracks may be disabled as a flash copy target.

Also, in one embodiment, the one or more tracks may be identified utilizing the first command, where the first command includes a command to create the one or more tracks within the volume of the storage system. In another embodiment, the one or more tracks may be identified utilizing the previous command, where the previous command includes a command to create the one or more tracks within the volume of the storage system that is sent prior to the first command.

Furthermore, as shown in FIG. 1, method 100 may proceed with operation 106, where a second command to copy data to the one or more tracks within the volume of the storage system is received. In one embodiment, the second command may include a copy services command (e.g., a flash copy command, etc.). In another embodiment, the second command may include a command to copy one or more tracks from a first volume to one or more tracks of a second volume within the storage system. In yet another embodiment, the second command may be issued during data migration occurring within the storage system, data migration occurring between the storage system and another storage system, etc.

Also, as shown in FIG. 1, method 100 may proceed with operation 108, where the one or more tracks within the volume of the storage system are identified as inhibited. In one embodiment, identifying the one or more tracks as inhibited may include identifying the one or more tracks and the associated marking (label, flag, index, etc.). In another embodiment, identifying the one or more tracks as inhibited may include identifying the one or more tracks as being disabled from being copied to via the copy service. In yet another embodiment, identifying the one or more tracks as inhibited may include identifying the one or more tracks as being disabled as a flash copy target. In still another embodiment, the one or more tracks may be identified by hardware within the storage system.

Additionally, as shown in FIG. 1, method 100 may proceed with operation 110, where the second command is rejected, in response to the identifying. In one embodiment, rejecting the second command may include returning an indication to the issuer of the second command. For example, the indication may include sense data indicating that the track is inhibited.

Additionally, in one embodiment, a third command to uninhibit the one or more tracks within the volume of the storage system may be received. In another embodiment, the third command may include a CCW that specifies the one or more tracks to be uninhibited. In yet another embodiment, the third command to uninhibit the one or more tracks may include a command to enable an outboard copying of data to the one or more tracks. For example, the third command may include a command to enable data from other tracks of other volumes to be written onto the one or more tracks.

Further, in one embodiment, in response to the third command, the one or more tracks may be uninhibited within the volume of the storage system. In one embodiment, uninhibiting the one or more tracks may include adjusting the one or more tracks so that the one or more tracks may be copied to (e.g., using a copy services command, etc.). For example, the one or more tracks may be enabled as a flash copy target. In still another embodiment, the one or more tracks may be uninhibited by hardware within the storage system.

In this way, copy service operations may be inhibited at the track level. For example, sensitive tracks may be protected. Additionally, removal or data overlay may be prevented, which may therefore prevent loss of access to data sets and/or allocation maps. Further still, uninhibited tracks within the volume may still be updated copied to, etc. This may allow for increased track usage and/or available space within the volume while still allowing data protection at a granular level.

Figure 2:
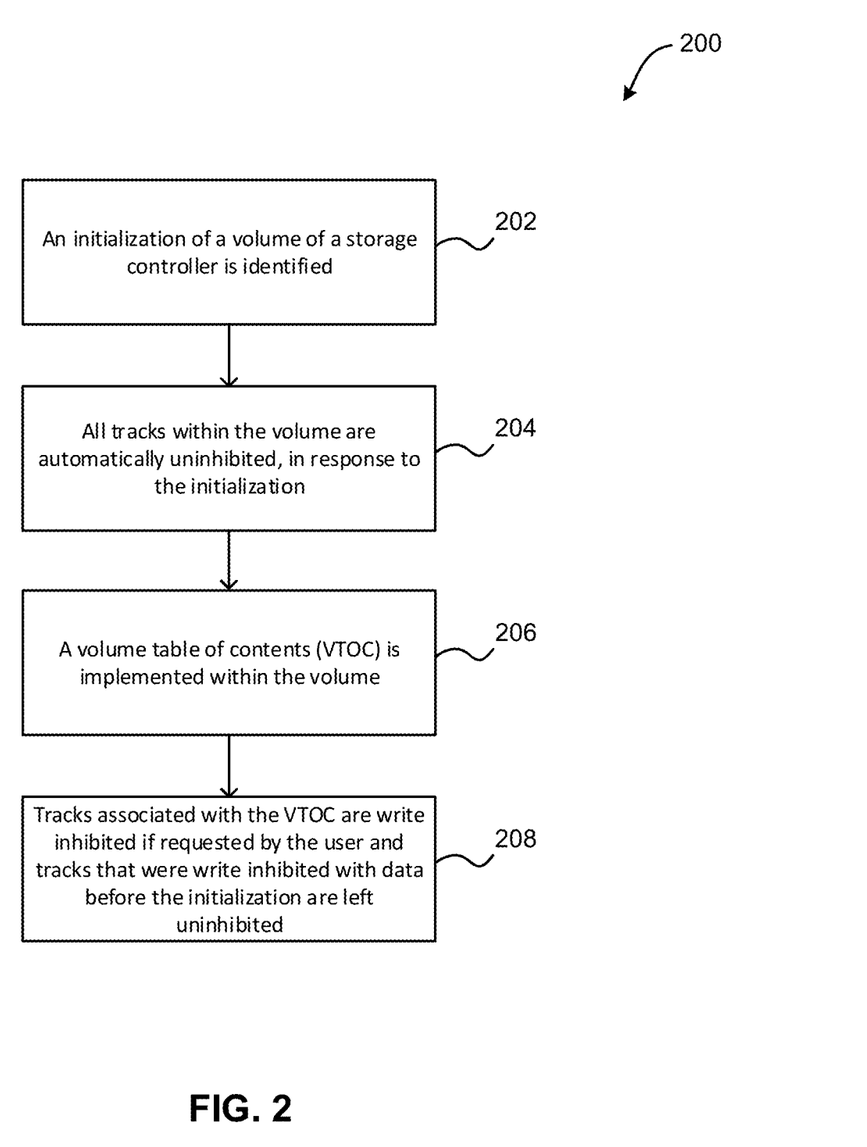
FIG. 2 illustrates a method for automatically implementing track protection within a VTOC after the VTOC is initialized within a volume, in accordance with one embodiment.

Now referring to FIG. 2, a flowchart of a method 200 for automatically implementing track protection within a VTOC after the VTOC is initialized within a volume is shown according to one embodiment. The method 200 may be performed in accordance with the present invention in any of the environments depicted in FIGS. 6-8, among others, in various embodiments. Of course, more or less operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 200 may initiate with operation 202, where an initialization of a volume of a storage system is identified. In one embodiment, identifying the initialization may include identifying an initialization command. For example, an initialization command (e.g., an ICKDSF INIT, etc.) may be received, where the initialization command initializes the volume of the storage system and builds a volume table of contents (VTOC) within the volume. In another embodiment, the initialization may be identified by hardware within the storage system.

Additionally, method 200 may proceed with operation 204, where all tracks within the volume are automatically uninhibited, in response to the initialization. In one embodiment, the tracks may be uninhibited by hardware within the storage system. Further, method 200 may proceed with operation 206, where a volume table of contents (VTOC) is implemented within the volume. In one embodiment, the VTOC may be implemented within tracks of the volume that are indicated by the initialization command. For example, the initialization command may indicate tracks within the volume where the VTOC is to be written.

Further still, method 200 may proceed with operation 208, where tracks associated with the VTOC are write inhibited, in response to the initialization. In one embodiment, the tracks associated with the VTOC may include all tracks onto which the VTOC is written. For example, the tracks associated with the VTOC may include all tracks storing dataset tracking records for the VTOC. In another embodiment, the initialization command may include instructions to write inhibit the tracks associated with the VTOC. In another embodiment, the initialization command may indicate the specific tracks of the volume that are to be write inhibited.

Also, in one embodiment, tracks that were write inhibited with data before the initialization may be left uninhibited. In another embodiment, the tracks associated with the VTOC may be automatically inhibited by hardware within the storage system. In this way, the VTOC may be automatically protected after it is initialized within a volume.

Figure 3:
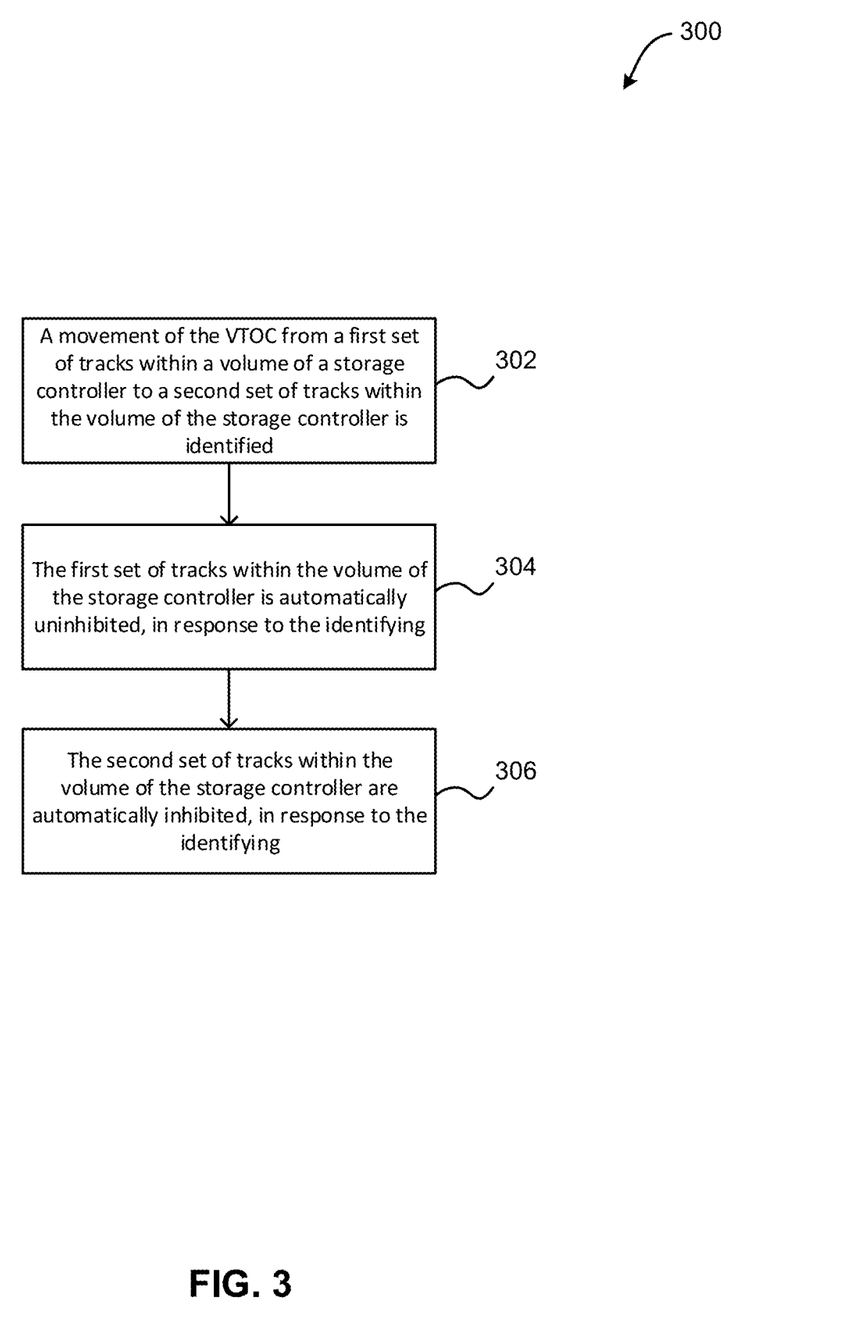
FIG. 3 illustrates a method for automatically implementing track protection within a VTOC after a location of the VTOC is transferred within the volume, in accordance with one embodiment.

Now referring to FIG. 3, a flowchart of a method 300 for automatically implementing track protection within a VTOC after a location of the VTOC is transferred within the volume is shown according to one embodiment. The method 300 may be performed in accordance with the present invention in any of the environments depicted in FIGS. 6-8, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a movement of the VTOC from a first set of tracks within a volume of a storage system to a second set of tracks within the volume of the storage system is identified. In one embodiment, the movement may be identified by hardware within the storage system. Additionally, method 300 may proceed with operation 304, where the first set of tracks within the volume of the storage system is automatically uninhibited, in response to the identifying.

Further, method 300 may proceed with operation 306, where the second set of tracks within the volume of the storage system are automatically inhibited, in response to the identifying. In one embodiment, the second set of tracks may be automatically inhibited by hardware within the storage system. In this way, the VTOC may be automatically protected after its location is transferred within the volume.

Figure 4:
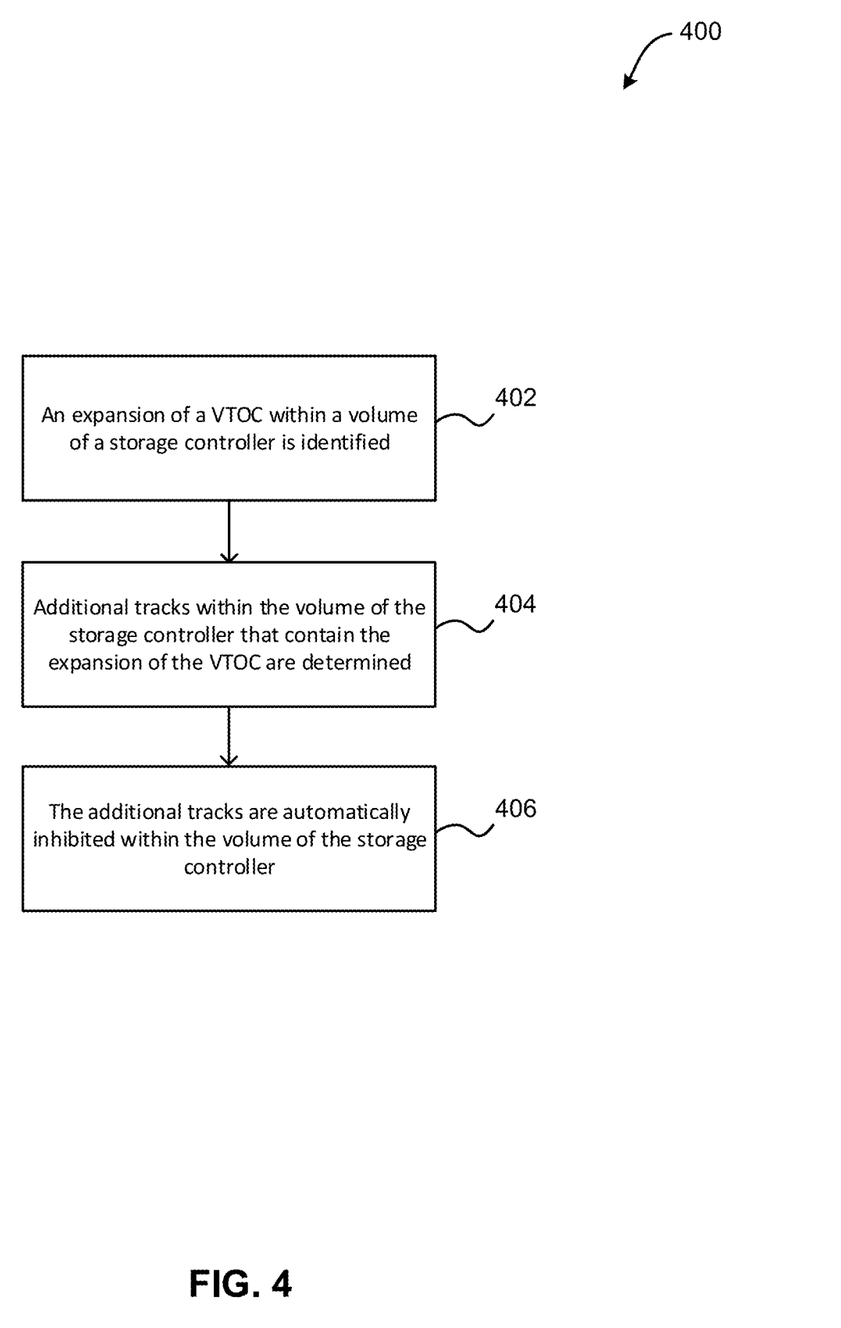
FIG. 4 illustrates a method for automatically implementing track protection within a VTOC after the VTOC has expanded within the volume, in accordance with one embodiment.

Now referring to FIG. 4, a flowchart of a method 400 for automatically implementing track protection within a VTOC after the VTOC has expanded within the volume is shown according to one embodiment. The method 400 may be performed in accordance with the present invention in any of the environments depicted in FIGS. 6-8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an expansion of a VTOC within a volume of a storage system is identified. In one embodiment, the expansion may be identified by hardware within the storage system. Additionally, method 400 may proceed with operation 404, where additional tracks within the volume of the storage system that contain the expansion of the VTOC are determined. In one embodiment, the additional tracks may be determined by hardware within the storage system.

Further, method 400 may proceed with operation 406, where the additional tracks are automatically inhibited within the volume of the storage system. In one embodiment, the additional tracks may be automatically inhibited by hardware within the storage system. In this way, the VTOC may be automatically protected after it has expanded within the volume.

Figure 5:
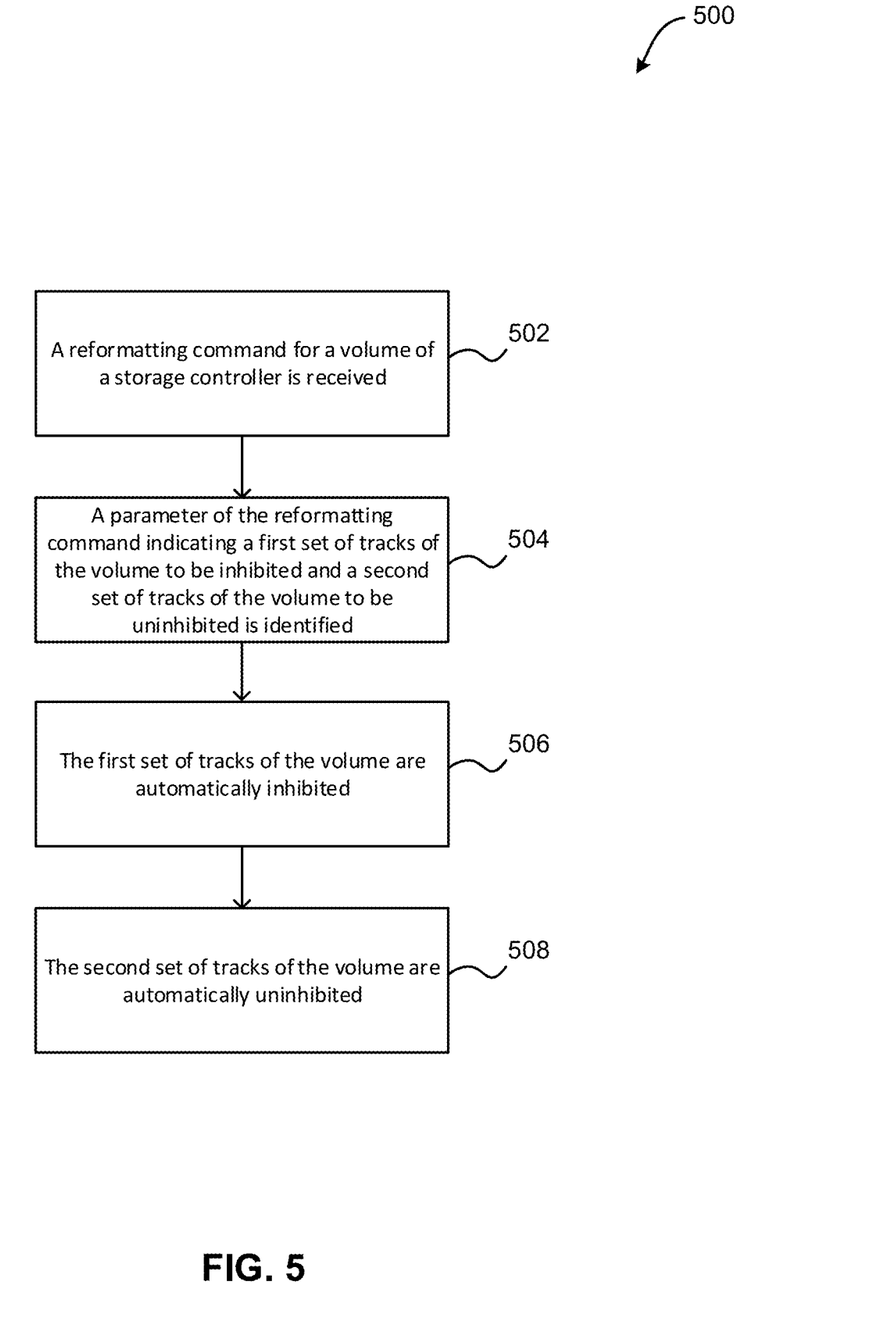
FIG. 5 illustrates a method for automatically implementing track protection of a volume after the volume is reformatted, in accordance with one embodiment.

Now referring to FIG. 5, a flowchart of a method 500 for automatically implementing track protection of a volume after the volume is reformatted is shown according to one embodiment. The method 500 may be performed in accordance with the present invention in any of the environments depicted in FIGS. 6-8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, a reformatting command for a volume of a storage system is received. In another embodiment, the reformatting command may be received by hardware within the storage system. Additionally, method 500 may proceed with operation 504, where a parameter of the reformatting command indicating a first set of tracks of the volume to be inhibited and a second set of tracks of the volume to be uninhibited is identified. In one embodiment, the parameter may be identified by hardware within the storage system.

Further, method 500 may proceed with operation 506, where the first set of tracks of the volume are automatically inhibited. In one embodiment, the first set of tracks may be automatically inhibited by hardware within the storage system. Further still, method 500 may proceed with operation 508, where the second set of tracks of the volume are automatically uninhibited. In one embodiment, the second set of tracks may be automatically uninhibited by hardware within the storage system. In this way, specific tracks of a volume may be automatically protected after the volume is reformatted.

Figure 6:
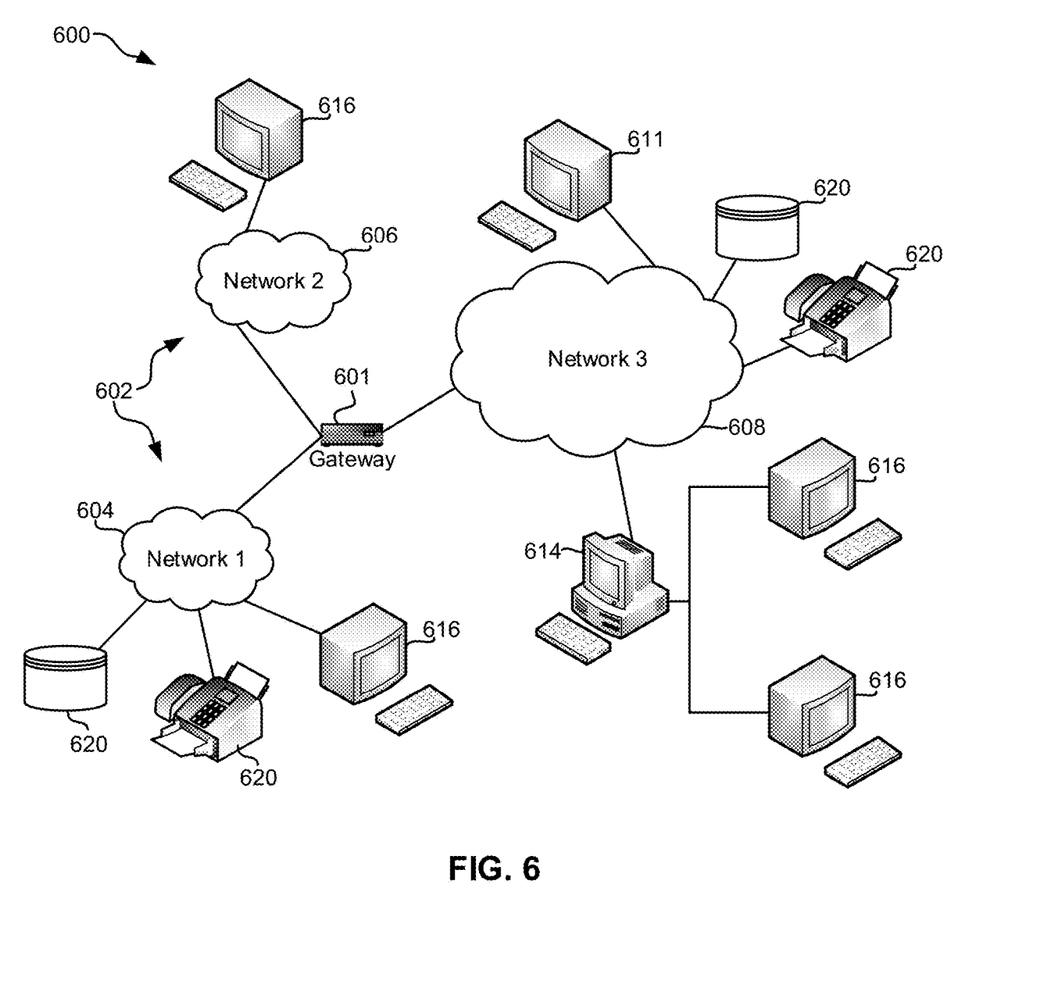
FIG. 6 illustrates a network architecture, in accordance with one embodiment.

FIG. 6 illustrates an architecture 600, in accordance with one embodiment. As shown in FIG. 6, a plurality of remote networks 602 are provided including a first remote network 604 and a second remote network 606. A gateway 601 may be coupled between the remote networks 602 and a proximate network 608. In the context of the present architecture 600, the networks 604, 606 may each take any form including, but not limited to a LAN, a WAN such as the Internet, public switched telephone network (PSTN), internal telephone network, etc.

In use, the gateway 601 serves as an entrance point from the remote networks 602 to the proximate network 608. As such, the gateway 601 may function as a router, which is capable of directing a given packet of data that arrives at the gateway 601, and a switch, which furnishes the actual path in and out of the gateway 601 for a given packet.

Further included is at least one data server 614 coupled to the proximate network 608, and which is accessible from the remote networks 602 via the gateway 601. It should be noted that the data server(s) 614 may include any type of computing device/groupware. Coupled to each data server 614 is a plurality of user devices 616. User devices 616 may also be connected directly through one of the networks 604, 606, 608. Such user devices 616 may include a desktop computer, lap-top computer, hand-held computer, printer or any other type of logic. It should be noted that a user device 611 may also be directly coupled to any of the networks, in one embodiment.

A peripheral 620 or series of peripherals 620, e.g., facsimile machines, printers, networked and/or local storage units or systems, etc., may be coupled to one or more of the networks 604, 606, 608. It should be noted that databases and/or additional components may be utilized with, or integrated into, any type of network element coupled to the networks 604, 606, 608. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 604, 606, 608, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 7:
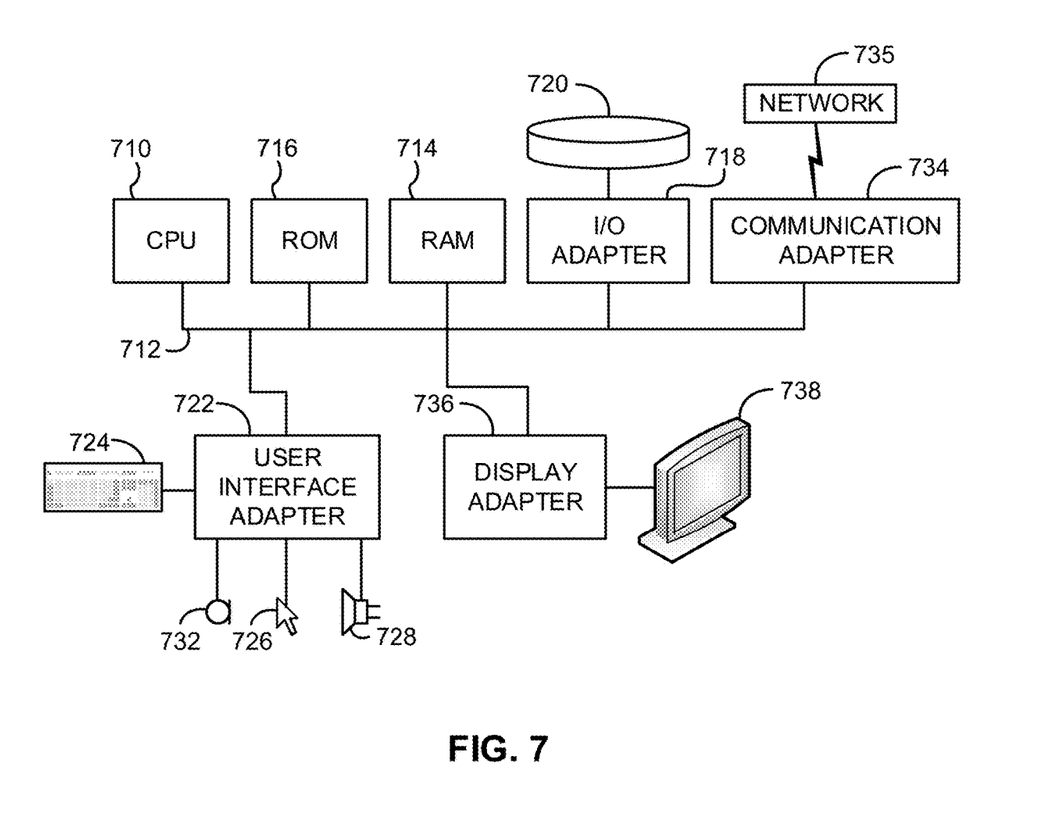
FIG. 7 shows a representative hardware environment that may be associated with the servers and/or clients of FIG. 6, in accordance with one embodiment.

FIG. 7 shows a representative hardware environment associated with a user device 616 and/or server 614 of FIG. 6, in accordance with one embodiment. Such figure illustrates a typical hardware configuration of a workstation having a central processing unit 710, such as a microprocessor, and a number of other units interconnected via a system bus 712.

The workstation shown in FIG. 7 includes a Random Access Memory (RAM) 714, Read Only Memory (ROM) 716, an I/O adapter 718 for connecting peripheral devices such as disk storage units 720 to the bus 712, a user interface adapter 722 for connecting a keyboard 724, a mouse 726, a speaker 728, a microphone 732, and/or other user interface devices such as a touch screen and a digital camera (not shown) to the bus 712, communication adapter 734 for connecting the workstation to a communication network 735 (e.g., a data processing network) and a display adapter 736 for connecting the bus 712 to a display device 738.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 8:
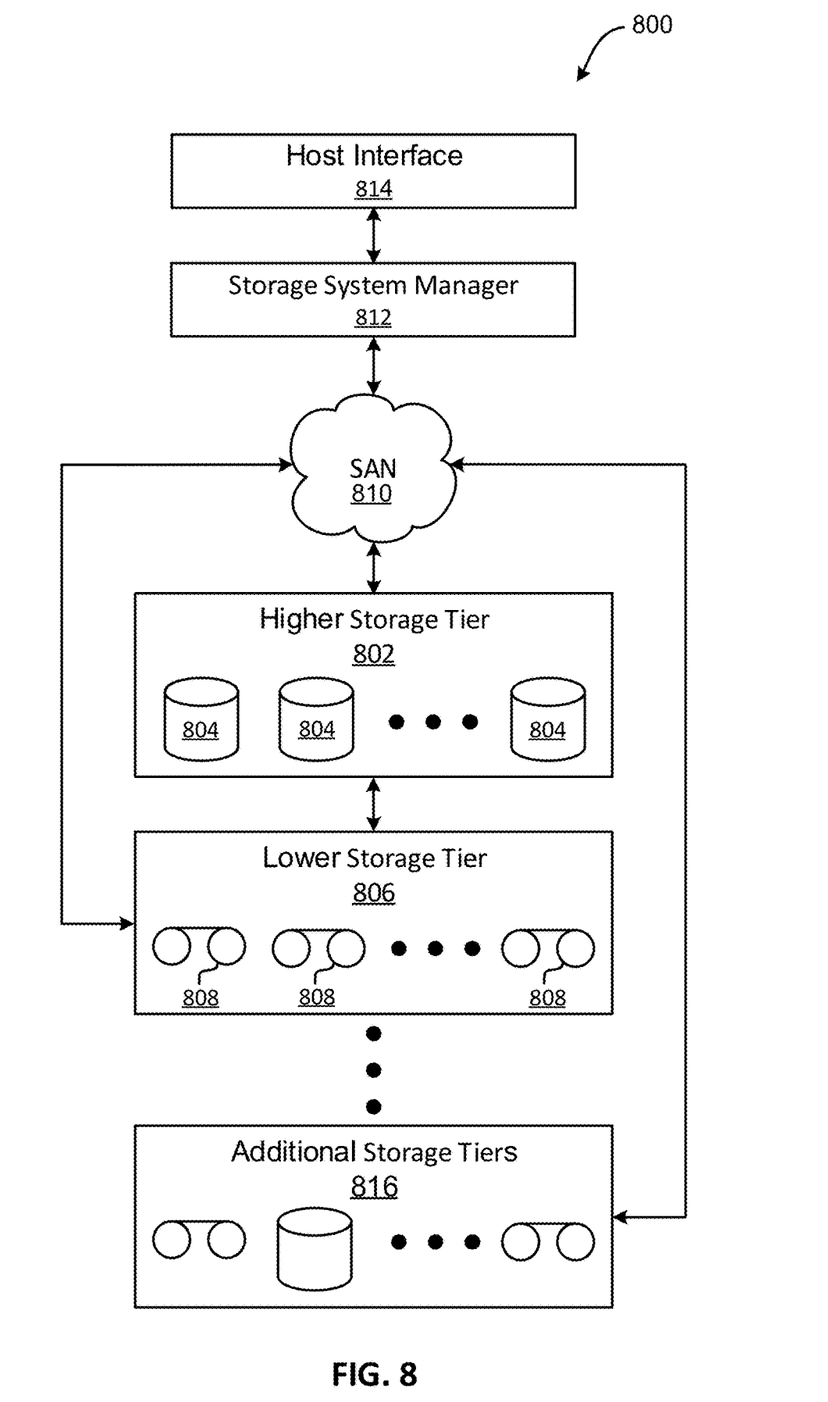
FIG. 8 illustrates a tiered data storage system in accordance with one embodiment.

Now referring to FIG. 8, a storage system 800 is shown according to one embodiment. Note that some of the elements shown in FIG. 8 may be implemented as hardware and/or software, according to various embodiments. The storage system 800 may include a storage system manager 812 for communicating with a plurality of media on at least one higher storage tier 802 and at least one lower storage tier 806. The higher storage tier(s) 802 preferably may include one or more random access and/or direct access media 804, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 806 may preferably include one or more lower performing storage media 808, including sequential access media such as magnetic tape in tape drives and/or optical media, slower accessing HDDs, slower accessing SSDs, etc., and/or others noted herein or known in the art. One or more additional storage tiers 816 may include any combination of storage memory media as desired by a designer of the system 800. Also, any of the higher storage tiers 802 and/or the lower storage tiers 806 may include some combination of storage devices and/or storage media.

The storage system manager 812 may communicate with the storage media 804, 808 on the higher storage tier(s) 802 and lower storage tier(s) 806 through a network 810, such as a storage area network (SAN), as shown in FIG. 8, or some other suitable network type. The storage system manager 812 may also communicate with one or more host systems (not shown) through a host interface 814, which may or may not be a part of the storage system manager 812. The storage system manager 812 and/or any other component of the storage system 800 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 800 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier

802, may include a majority of SSD storage media for storing data in a higher performing storage environment, and remaining storage tiers, including lower storage tier 806 and additional storage tiers 816 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 802, while data not having one of these attributes may be stored to the additional storage tiers 816, including lower storage tier 806. Of course, one of skill in the art, upon reading the present descriptions, may devise many other combinations of storage media types to implement into different storage schemes, according to the embodiments presented herein.

According to some embodiments, the storage system (such as 800) may include logic configured to receive a request to open a data set, logic configured to determine if the requested data set is stored to a lower storage tier 806 of a tiered data storage system 800 in multiple associated portions, logic configured to move each associated portion of the requested data set to a higher storage tier 802 of the tiered data storage system 800, and logic configured to assemble the requested data set on the higher storage tier 802 of the tiered data storage system 800 from the associated portions.

Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving a first command to initialize a volume of a storage system, where the volume includes a hardware volume including a recording surface divided into a plurality of concentric tracks, and the first command includes an indication of a plurality of specific tracks within the volume onto which a volume table of contents (VTOC) is to be written;
in response to the first command:
automatically uninhibiting all tracks within the volume by hardware within the storage system,
identifying the plurality of specific tracks within the volume of the storage system indicated by the first command, where each of the plurality of specific tracks includes a predetermined portion of the recording surface of the volume of the storage system,
inhibiting, by the hardware within the storage system, the plurality of specific tracks within the volume of the storage system by marking the plurality of specific tracks as inhibited utilizing a flag, and
implementing the VTOC within the plurality of specific tracks;
receiving a second command to copy data to the plurality of specific tracks within the volume of the storage system;
identifying the plurality of specific tracks within the volume of the storage system as inhibited;
rejecting the second command, in response to the identifying;
identifying an expansion of the VTOC within the volume of the storage system;
determining additional tracks of the volume of the storage system that contain the expansion of the VTOC;
automatically inhibiting the additional tracks within the volume of the storage system by hardware within the storage system;
receiving a reformatting command for the volume of the storage system, where a parameter of the reformatting command indicates a first set of tracks of the volume to be inhibited and a second set of tracks of the volume to be uninhibited; and
after the volume is reformatted, automatically inhibiting the first set of tracks of the volume, and automatically uninhibiting the second set of tracks of the volume.

2. The computer-implemented method of claim 1, wherein:
the storage system includes a direct access storage device (DASD),
the first command includes a channel program (CCW),
the second command includes a copy services command.

3. The computer-implemented method of claim 1, wherein:
inhibiting the plurality of specific tracks within the volume of the storage system includes disabling the plurality of specific tracks as a flash copy target by the hardware within the storage system, and
identifying the plurality of specific tracks as inhibited includes identifying the plurality of specific tracks as being disabled as the flash copy target by the hardware within the storage system.

4. The computer-implemented method of claim 1, wherein inhibiting the plurality of specific tracks includes preventing outboard copying to the plurality of specific tracks.

5. The computer-implemented method of claim 1, wherein the second command includes a copy services command.

6. The computer-implemented method of claim 1, wherein the second command is issued during data migration.

7. The computer-implemented method of claim 1, further comprising receiving a third command to uninhibit the plurality of specific tracks within the volume of the storage system.

8. The computer-implemented method of claim 7, further comprising uninhibiting the plurality of specific tracks within the volume of the storage system in response to the third command.

9. A computer program product for inhibiting one or more tracks within a volume of a storage system, the computer program product comprising a computer readable storage medium having program instructions embodied therewith, wherein the computer readable storage medium is not a transitory signal per se, the program instructions executable by hardware within the storage system to cause the hardware to perform a method comprising:

receiving a first command to initialize a volume of a storage system, utilizing the hardware, where the volume includes a hardware volume including a recording surface divided into a plurality of concentric tracks, and the first command includes an indication of a plurality of specific tracks within the volume onto which a volume table of contents (VTOC) is to be written;

in response to the first command:
automatically uninhibiting, utilizing the hardware, all tracks within the volume by the hardware within the storage system,
identifying, utilizing the hardware, the plurality of specific tracks within the volume of the storage system indicated by the first command, where each of the plurality of specific tracks includes a predetermined portion of the recording surface of the volume of the storage system,
inhibiting the plurality of specific tracks within the volume of the storage system by marking the plurality of specific tracks as inhibited utilizing a flag, utilizing the hardware, and
implementing the VTOC within the plurality of specific tracks, utilizing the hardware;

receiving a second command to copy data to the plurality of specific tracks within the volume of the storage system, utilizing the hardware;
identifying the plurality of specific tracks within the volume of the storage system as inhibited, utilizing the hardware;
rejecting the second command, in response to the identifying, utilizing the hardware;
identifying, utilizing the hardware, an expansion of the VTOC within the volume of the storage system;
determining, utilizing the hardware, additional tracks of the volume of the storage system that contain the expansion of the VTOC;
automatically inhibiting the additional tracks within the volume of the storage system, utilizing the hardware;
receiving, utilizing the hardware, a reformatting command for the volume of the storage system, where a parameter of the reformatting command indicates a first set of tracks of the volume to be inhibited and a second set of tracks of the volume to be uninhibited; and
after the volume is reformatted, automatically inhibiting the first set of tracks of the volume, and automatically uninhibiting the second set of tracks of the volume, utilizing the hardware.

10. The computer-implemented method of claim 1, wherein inhibiting the plurality of specific tracks includes disabling the plurality of specific tracks from being copied to via a copy service.

11. The computer-implemented method of claim 1, wherein the storage system includes one or more read/write heads used to transfer data as the recording surface rotates past one or more read/write heads.

12. The computer-implemented method of claim 1, wherein the first command includes a volume-level inhibit outboard copy channel program (CCW) that has been modified to operate at a track level as well as a volume level.

13. A system, comprising:
a processor; and
logic integrated with the processor, executable by the processor, or integrated with and executable by the processor, the logic being configured to:
receive a first command to initialize a volume of a storage system, where the volume includes a hardware volume including a recording surface divided into a plurality of concentric tracks, and the first command includes an indication of a plurality of specific tracks within the volume onto which a volume table of contents (VTOC) is to be written;
in response to the first command:
automatically uninhibit all tracks within the volume by hardware within the storage system,
identify the plurality of specific tracks within the volume of the storage system indicated by the first command, where each of the plurality of specific tracks includes a predetermined portion of the recording surface of the volume of the storage system,
inhibit, by the hardware within the storage system, the plurality of specific tracks within the volume of the storage system by marking the plurality of specific tracks as inhibited utilizing a flag, and
implementing the VTOC within the plurality of specific tracks;
receive a second command to copy data to the plurality of specific tracks within the volume of the storage system;
identify the plurality of specific tracks within the volume of the storage system as inhibited;
reject the second command, in response to the identification;
identify an expansion of the VTOC within the volume of the storage system;
determine additional tracks of the volume of the storage system that contain the expansion of the VTOC;
automatically inhibit the additional tracks within the volume of the storage system by hardware within the storage system;
receive a reformatting command for the volume of the storage system, where a parameter of the reformatting command indicates a first set of tracks of the volume to be inhibited and a second set of tracks of the volume to be uninhibited; and
after the volume is reformatted, automatically inhibit the first set of tracks of the volume, and automatically uninhibit the second set of tracks of the volume.

* * * * *